US010633535B2

(12) United States Patent
Kim (10) Patent No.: US 10,633,535 B2
(45) Date of Patent: Apr. 28, 2020

(54) POLYESTER POLYMER COMPOSITIONS

(71) Applicant: Ticona LLC, Florence, KY (US)

(72) Inventor: Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 15/889,354

(22) Filed: Feb. 6, 2018

(65) Prior Publication Data

US 2018/0223096 A1 Aug. 9, 2018

Related U.S. Application Data

(60) Provisional application No. 62/455,259, filed on Feb. 6, 2017.

(51) Int. Cl.
| | | |
|---|---|---|
| *F21S 45/48* | (2018.01) | |
| *C08L 67/02* | (2006.01) | |
| *F21S 45/47* | (2018.01) | |
| *G03B 17/02* | (2006.01) | |
| *F21Y 115/10* | (2016.01) | |
| *F21S 41/143* | (2018.01) | |

(52) U.S. Cl.
CPC .............. *C08L 67/02* (2013.01); *F21S 45/47* (2018.01); *F21S 45/48* (2018.01); *C08L 2203/206* (2013.01); *C08L 2205/025* (2013.01); *C08L 2205/08* (2013.01); *F21S 41/143* (2018.01); *F21Y 2115/10* (2016.08); *G03B 17/02* (2013.01)

(58) Field of Classification Search
USPC ................................................ 528/271, 272
See application file for complete search history.

(56) References Cited

U.S. PATENT DOCUMENTS

| | | | |
|---|---|---|---|
| 3,908,061 | A | 9/1975 | Byrne et al. |
| 4,161,470 | A | 7/1979 | Calundann |
| 4,364,993 | A | 12/1982 | Edelman et al. |
| 4,444,931 | A | 4/1984 | Lu et al. |
| 4,559,164 | A | 12/1985 | Kostelnik et al. |
| 4,886,847 | A | 12/1989 | Bastioli et al. |
| 5,096,951 | A | 3/1992 | Auerbach |
| 5,508,374 | A | 4/1996 | Lee et al. |
| 5,616,680 | A | 4/1997 | Linstid, III |
| 5,679,733 | A | 10/1997 | Malik et al. |
| 6,114,492 | A | 9/2000 | Linstid, III et al. |
| 6,150,446 | A | 11/2000 | Numata |
| 6,221,962 | B1 | 4/2001 | Heino et al. |
| 6,344,513 | B1 | 2/2002 | Numata |
| 6,414,155 | B1 | 7/2002 | Sassi et al. |
| 6,426,128 | B1 * | 7/2002 | Kimmel .................. B29C 49/22 428/1.1 |
| 6,514,611 | B1 | 2/2003 | Shepherd et al. |
| 6,528,572 | B1 | 3/2003 | Patel et al. |
| 6,540,945 | B2 | 4/2003 | Kubotera et al. |
| 6,560,840 | B1 | 5/2003 | Jenkins et al. |
| 6,730,378 | B2 | 5/2004 | Matsuoka et al. |
| 6,730,731 | B2 | 5/2004 | Tobita et al. |
| 7,445,797 | B2 | 11/2008 | Meneghetti et al. |
| 7,608,666 | B2 | 10/2009 | Matsuoka et al. |
| 7,612,130 | B2 | 11/2009 | Kim |
| 7,648,748 | B2 | 1/2010 | Nakane et al. |
| 7,776,410 | B2 | 8/2010 | Nakane et al. |
| 7,825,176 | B2 | 11/2010 | Kim et al. |
| 7,858,172 | B2 | 12/2010 | Imaizumi et al. |
| 7,960,473 | B2 | 6/2011 | Kobayashi et al. |
| 8,034,866 | B2 | 10/2011 | Zhu et al. |
| 8,067,493 | B2 | 11/2011 | Zhu et al. |
| 8,324,307 | B2 | 12/2012 | Harder et al. |
| 8,646,994 | B2 | 2/2014 | Kim et al. |
| 8,658,057 | B2 | 2/2014 | Nakayama et al. |
| 8,683,683 | B2 | 4/2014 | Knoll et al. |
| 8,741,998 | B2 | 6/2014 | l'Abee et al. |
| 8,796,392 | B2 | 8/2014 | Luo et al. |
| 8,834,741 | B2 | 9/2014 | Shiraishi et al. |
| 8,852,487 | B2 | 10/2014 | Feng et al. |
| 8,906,259 | B2 | 12/2014 | Kim |
| 8,926,862 | B2 | 1/2015 | Kim et al. |
| 8,932,483 | B2 | 1/2015 | Kim |
| 8,946,333 | B2 | 2/2015 | Raman et al. |
| 9,062,198 | B2 | 6/2015 | Lu |
| 9,074,070 | B2 | 7/2015 | Yung et al. |
| 9,080,036 | B2 | 7/2015 | Luo et al. |
| 9,090,751 | B2 | 7/2015 | Saga et al. |
| 9,119,307 | B2 | 8/2015 | Luo et al. |
| 9,127,142 | B2 | 9/2015 | Luo et al. |
| 9,284,435 | B2 | 3/2016 | Kim |
| 9,355,753 | B2 | 5/2016 | Kim |
| 9,512,293 | B2 | 12/2016 | Kim |
| 9,512,312 | B2 | 12/2016 | Mazahir et al. |
| 9,862,809 | B2 | 1/2018 | Kim et al. |

(Continued)

FOREIGN PATENT DOCUMENTS

| | | |
|---|---|---|
| CN | 101343409 | 1/2009 |
| CN | 102408685 | 4/2012 |

(Continued)

OTHER PUBLICATIONS

Abstract of WO Patent W09515360, Jun. 8, 1995, 1 page.

(Continued)

*Primary Examiner* — Terressa Boykin (74) *Attorney, Agent, or Firm* — Dority & Manning, P.A.

(57) ABSTRACT

Polyester polymer compositions are described containing a blend of different polyester polymers. The different polyester polymers can be blended together in order to produce an overall composition having a desired balance of physical properties and surface characteristics. In one embodiment, a compatibilizing agent can be added to prevent the polyester polymers from adversely interacting with each other. The composition can contain glass fibers and/or a thermally conductive particulate material. Polymer compositions can be produced having excellent strength characteristics, high glossiness characteristics, and can be thermally conductive.

21 Claims, 2 Drawing Sheets

(56) References Cited

U.S. PATENT DOCUMENTS

| | | |
|---|---|---|
| 2002/0051874 A1 | 5/2002 | Ishibashi et al. |
| 2002/0172786 A1 | 11/2002 | Matsuoka et al. |
| 2003/0060529 A1 | 3/2003 | Ho et al. |
| 2003/0096070 A1 | 5/2003 | Matsuoka et al. |
| 2004/0254280 A1 | 12/2004 | Richter et al. |
| 2005/0186438 A1 | 8/2005 | Alms et al. |
| 2006/0030659 A1 | 2/2006 | DeStio |
| 2006/0100330 A1 | 5/2006 | Natarajan et al. |
| 2007/0073007 A1 | 3/2007 | Harashina |
| 2007/0182059 A1 | 8/2007 | Ikegawa et al. |
| 2007/0213458 A1 | 9/2007 | Topoulos |
| 2008/0009576 A1 | 1/2008 | Alexander et al. |
| 2008/0167410 A1 | 7/2008 | Shim et al. |
| 2010/0197827 A1 | 8/2010 | Kim et al. |
| 2010/0227143 A1 | 9/2010 | Mulholland |
| 2010/0297453 A1 | 11/2010 | Maenaka et al. |
| 2010/0324189 A1 | 12/2010 | Brockmuller et al. |
| 2012/0232188 A1 | 9/2012 | Nakayama |
| 2013/0098666 A1 | 4/2013 | Lee |
| 2013/0119317 A1 | 5/2013 | Kim et al. |
| 2013/0123420 A1 | 5/2013 | Kim |
| 2013/0146344 A1 | 6/2013 | Lee et al. |
| 2013/0156565 A1 | 6/2013 | Feng |
| 2013/0157780 A1 | 6/2013 | Kim et al. |
| 2013/0199412 A1 | 8/2013 | Christ et al. |
| 2014/0004328 A1 | 1/2014 | Kim et al. |
| 2014/0066564 A1 | 3/2014 | Kaushik et al. |
| 2014/0154479 A1 | 6/2014 | Yun et al. |
| 2014/0171575 A1 | 6/2014 | Mercx et al. |
| 2014/0264183 A1 | 9/2014 | Kim |
| 2014/0272226 A1 | 9/2014 | Kim |
| 2014/0350163 A1 | 11/2014 | Kim et al. |
| 2014/0364025 A1 | 12/2014 | Zhang et al. |
| 2015/0080518 A1 | 3/2015 | Moniruzzaman |
| 2015/0104165 A1 | 4/2015 | Kim |
| 2015/0112019 A1 | 4/2015 | Kim et al. |
| 2015/0175805 A1 | 6/2015 | Schaefer |
| 2015/0225547 A1 | 8/2015 | Tu et al. |
| 2015/0274964 A1 | 10/2015 | Washio et al. |
| 2015/0291776 A1 | 10/2015 | Kim |
| 2015/0291796 A1 | 10/2015 | Kim |
| 2015/0368460 A1 | 12/2015 | Sohn et al. |
| 2016/0053072 A1 | 2/2016 | Yung et al. |
| 2016/0053107 A1 | 2/2016 | Mazahir et al. |
| 2016/0053117 A1 | 2/2016 | Nair et al. |
| 2016/0053118 A1 | 2/2016 | Nair et al. |
| 2016/0152801 A1 | 6/2016 | Yu et al. |
| 2016/0185940 A1 | 6/2016 | Kim |
| 2017/0029596 A1 | 2/2017 | Kim et al. |
| 2017/0029682 A1 | 2/2017 | Kim et al. |
| 2017/0051147 A1 | 2/2017 | Kim |
| 2019/0241735 A1 | 8/2019 | Zierer et al. |

FOREIGN PATENT DOCUMENTS

| | | |
|---|---|---|
| CN | 102424720 | 4/2012 |
| CN | 102516726 | 6/2012 |
| CN | 102532818 | 7/2012 |
| CN | 102827463 | 12/2012 |
| CN | 102977560 | 3/2013 |
| CN | 103709703 | 4/2014 |
| CN | 103788588 | 5/2014 |
| CN | 103834145 | 6/2014 |
| CN | 103897213 | 7/2014 |
| CN | 104194286 | 12/2014 |
| CN | 104262675 | 1/2015 |
| DE | 102009023529 | 12/2010 |
| DE | 102011079525 | 1/2013 |
| EP | 0468673 | 7/1991 |
| EP | 2562206 | 2/2013 |
| EP | 2860214 | 4/2015 |
| JP | S5590551 | 7/1980 |
| JP | H02167345 | 6/1990 |
| JP | H08208954 | 8/1996 |
| WO | WO 2004/058851 | 7/2004 |
| WO | WO 2013/129338 A1 | 6/2013 |
| WO | WO 2014/087842 A1 | 6/2014 |
| WO | WO 2014/098847 | 6/2014 |
| WO | WO 2015/031573 | 3/2015 |

OTHER PUBLICATIONS

Abstract of Japanese Patent JPH08134334, May 28, 1996, 2 pages.
Abstract of Japanese Patent JP2000080289, Mar. 21, 2000, 1 page.
Abstract of Japanese Patent JP2000313812, Nov. 14, 2000, 1 page.
Abstract of Japanese Patent JP2000313798, Nov. 14, 2000, 1 page.
Abstract of Japanese Patent JP2005023094, Jan. 27, 2005, 2 pages.
Abstract of Japanese Patent JP2005187809, Jul. 14, 2005, 1 page.
Abstract of Japanese Patent JP2006117731, May 11, 2006, 1 page.
Abstract of Japanese Patent JP2006089701, Jun. 6, 2006, 1 page.
Abstract of EP Patent EP1703234, Sep. 20, 2006, 2 pages.
Abstract of Japanese Patent JP2006327301, Dec. 7, 2006, 2 pages.
Abstract of Japanese Patent JP2006347151, Dec. 28, 2006, 1 page.
Abstract of WO Patent WO2007043701, Apr. 19, 2007, 1 page.
Abstract of Japanese Patent JP2007211211, Aug. 23, 2007, 1 page.
Abstract of Japanese Patent JP2007238851, Sep. 20, 2007, 1 page.
Abstract of Japanese Patent JP2007254716, Oct. 4, 2007, 1 page.
Abstract of Japanese Patent JP2007254717, Oct. 4, 2007, 1 page.
Abstract of Japanese Patent JP2007277292, Oct. 25, 2007, 1 page.
Abstract of Chinese Patent CN101305056, Nov. 12, 2008, 1 page.
Abstract of Japanese Patent JP4600015, Dec. 15, 2010, 1 page.
Abstract of Japanese Patent JP4600016, Dec. 15, 2010, 1 page.
Abstract of Japanese Patent JP2011137064, Jul. 14, 2011, 1 page.
Abstract of Japanese Patent JP2012251130, Dec. 20, 2012, 2 pages.
Abstract of Japanese Patent JP2013014781, Jan. 24, 2013, 1 page.
Abstract of Japanese Patent JP2015000949, Jan. 5, 2015, 1 page.
Abstract of Japanese Patent JP2015021110, Feb. 2, 2015, 1 page.
Abstract of Korean Patent KR20150011768, Feb. 2, 2015, 1 page.
Abstract of Chinese Patent CN104341721, Feb. 11, 2015, 1 page.
Abstract of Taiwanese Patent TW201522578, Jun. 16, 2015, 2 pages.
Product Bulletin for Boron Nitride Powder from Momentive, Sep. 2012, 2 pages.
Product Bulletin for PolarTherm* Boron Nitride Powder from Momentive, Sep. 2012, 2 pages.
Material Property Data for DuPont Elvaloy® PTW Ethylene/N-Butyl Acrylate/Glycidyl Methacrylate Copolymer from E. I. du Pont de Nemours and Company, Inc., Aug. 10, 2015, 2 pages.
Product Data Sheet for Elvaloy® resins from E. I. du Pont de Nemours and Company, Inc., Jun. 8, 2015, 3 pages.
Product Information on Lotader® AX8840 from Arkema, Apr. 2014, 2 pages.
Material Safety Data Sheet on Lotader® AX8840 from Arkema, Jul. 11, 2011, 8 pages.
Machine Translation of Chinese Patent CN101305056, Nov. 12, 2008, 13 pages.
Machine Translation of Chinese Patent CN104040422, Sep. 10, 2014, 20 pages.
Product Information on Doverphos S-9228, Solid Phosphite Antioxidant, Dover Chemical Corporation, Jul. 19, 2012, 1 page.
Mercx, et al.: Thermally conductive flame retardant polymer compositions and use thereof; Jun. 2014; SABIC Innovative Plastics IP B.V., Neth; Chem Asbtract 161:86661 (5 of 6 Caplus of the new search, U.S. Appl. No. 15/221,699).
Zhang et al; A polyamide molding composition; Jul. 29, 2015; Kingfa /science and Technology Co., Ltd. Peop. Rep. China; Chem Abstract 163: 271487 (5/8 reference in U.S. Appl. No. 15/221,699).
Technical Data Sheet for Irgafos® 126, BASF, Jul. 2010 Rev. 1.
Technical Data Sheet for Irganox® 1010, BASF, Jul. 2010 Rev. 1.
Technical Information for CF treated/preprocessed, AKRO-PlasticGmbh, Apr. 30, 2015.

* cited by examiner

POLYESTER POLYMER COMPOSITIONS

RELATED APPLICATIONS

The present application claims priority to U.S. Provisional Application Ser. No. 62/455,259, filed on Feb. 6, 2017, which is incorporated herein by reference in its entirety.

BACKGROUND

Engineering thermoplastics and elastomeric materials are often used in numerous and diverse applications in order to produce molded parts and products. For instance, polyester polymers and polyester elastomers are used to produce all different types of molded products, such as injection molded products, blow molded products, and the like. Polyester polymers, for instance, can be formulated in order to be chemically resistant, to have excellent strength properties and, when formulating compositions containing polyester elastomers, to be flexible. Of particular advantage, polyester polymers can be melt processed due to their thermoplastic nature. In addition, polyester polymers can be recycled and reprocessed.

Although polyester polymers can be used in numerous applications, the materials do have some limitations. For example, problems have been experienced in the past in processing polyester polymers. For instance, some polyester polymers have relatively high viscosities or other flow properties that create problems when molding the polymers into different shapes. Polyester polymers, particularly polyester elastomers, for instance, can have low melt strength which causes issues during extrusion and blow molding. In addition, polyester polymers may darken or yellow in color over time and may produce a surface appearance that is less than desirable. For instance, many polyester polymers have a tendency to produce a dull surface. For example, a need currently exists for a polyester polymer composition having higher surface gloss characteristics in conjunction with higher strength characteristics.

In certain applications, thermoplastic polymers are combined with fibrous fillers in order to increase the modulus of parts and products made from the reinforced composition. Problems have also been experienced in the past in incorporating reinforcing fibers into a polyester polymer matrix that has the desired balance of properties. For instance, polyester polymer composites containing reinforcing fibers may have adequate strength properties but have relatively low elongation at break properties.

In view of the above, a need exists for polyester polymer compositions that can be formulated so as to have a desired balance of physical properties and characteristics.

SUMMARY

In general, the present disclosure is directed to polyester polymer compositions containing a blend of polyester polymers. The different polyester polymers are blended in order to produce a desired improvement in overall physical properties and characteristics. In one embodiment, for instance, various different polyester polymers can be combined together in order to produce molded articles having excellent gloss characteristics and strength properties. In addition, the present disclosure is directed to different methods and techniques for improving the compatibility between two different polyester polymers so that the polymers can be combined together in a way that produces synergistic results.

In one embodiment, for instance, the present disclosure is directed to a polymer composition comprising a first polyester polymer combined and blended with a second polyester polymer. The polyester polymers blended together can include a polyethylene terephthalate, a polybutylene terephthalate, a thermotropic liquid crystalline polymer, a polycyclohexylenedimethylene terephthalate polymer, a polyester elastomer, and the like. In one embodiment, for instance, the first polyester polymer may comprise a polyethylene terephthalate polymer or a polybutylene terephthalate polymer. The second polyester polymer, on the other hand, may comprise a thermotropic liquid crystalline polymer, a polycyclohexylenedimethylene terephthalate polymer, or a copolyester elastomer. In particular embodiments, for instance, the polyester blend may comprise a blend of a polyethylene terephthalate polymer and a polybutylene terephthalate polymer. Alternatively, the blend may comprise a polyethylene terephthalate polymer in combination with a thermotropic liquid crystalline polymer. The first polyester polymer, for instance, may have a different crystallization rate than the second polyester polymer.

In one embodiment, the first polyester polymer is combined with the second polyester polymer in a manner to inhibit or prevent unwanted chemical reactions from occurring between the two polymers. In one embodiment, for instance, the polymer composition may contain a compatibilizing agent for the first polyester polymer and the second polyester polymer. The compatibilizing agent may be configured to inhibit reaction between the first and second polyester polymers. For example, the compatibilizing agent may comprise a phosphorus compound, such as a diphosphite. In one embodiment, for instance, the compatibilizing agent may comprise a pentaerythritol diphosphite. The compatibilizing agent is capable of improving the compatibility of the polyester polymers and therefore improving the physical properties of the composition while being present in relatively minor amounts. For example, the compatibilizing agent can be present in the polymer composition in an amount from about 0.05% to about 5% by weight.

In addition to a blend of polyester polymers, the polymer composition can contain various other components and ingredients depending upon the particular application and the desired properties of any molded product produced from the composition. In one embodiment, for instance, the polymer composition can contain reinforcing fibers. For example, in one embodiment, the polymer composition may contain glass fibers. The glass fibers, for instance, can be present in an amount from about 10% to about 60% by weight, such as in an amount from about 30% to about 60% by weight.

In one embodiment, the polymer composition can be formulated so as to be thermally conductive. For instance, the polymer composition may have a thermal conductivity of about 2 W/m-K or more. In this embodiment, the polymer composition can contain a thermally conductive particulate material alone or in combination with reinforcing fibers. The thermally conductive particulate material, for instance, may comprise a carbon containing material, boron nitride, or combinations thereof. In one embodiment, the thermally conductive particulate material is in the form of flakes or plate-like particles. For example, in one embodiment, the thermally conductive particulate material comprises graphite. The thermally conductive particulate material can be present in the composition in an amount from about 2% by weight to about 30% by weight, such as in an amount from about 4% by weight to about 15% by weight, such as in an amount from about 5% by weight to about 10% by weight.

By combining different polyester polymers together in accordance with the present disclosure, numerous and diverse different products and parts can be produced having an excellent balance of physical properties. The polymer composition of the present disclosure, for instance, can be formulated so as to have excellent strength properties in combination with desirable surface properties. For instance, different polyester thermoplastic polymers can be combined together in accordance with the present disclosure to produce a composition having a tensile strength of greater than about 100 MPa, such as greater than about 110 MPa, such as greater than about 120 MPa. The composition can also have a flexural modulus of greater than about 10,000 MPa, such as greater than about 12,000 MPa. In addition, molded articles made from the composition can have excellent gloss characteristics. For example, the exterior surface of a molded part or product can have at least 40%, such as at least 50% glossiness when measured at a 60° angle of incidence.

Numerous and different products and parts may be molded from a composition made in accordance with the present disclosure. In one embodiment, when the composition is formulated to have a balance of strength and gloss characteristics, the composition can be used to mold parts for use in a lighting assembly. The lighting assembly, for instance, can contain an LED module that contains one or more light-emitting diodes. The polymer composition of the present disclosure can be used not only to reflect light from the light assembly but can also be used to absorb and transfer heat. For instance, the polymer composition of the present disclosure can be used as a reflector and/or as a heat sink within the light assembly. The light assembly, in one embodiment, may comprise an automotive headlamp. The automotive headlamp, for instance, may include an LED lamp, a housing, and a heat sink. In one embodiment, the composition of the present disclosure can be used to produce one or more frame members that comprise the housing or are contained within the housing.

A polymer composition in accordance with the present disclosure can also be used to produce a camera module. The camera module can comprise a generally planar base on which is mounted a carrier assembly. The base, the carrier assembly, or both can contain a part molded from a polymer composition made in accordance with the present disclosure.

When the polymer composition is used to construct a light assembly and/or a camera module, the polymer composition may contain reinforcing fibers alone or in combination with a thermally conductive particulate material.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to polymer compositions containing a mixture of polyester polymers. The present disclosure is also directed to products and parts that can be molded from the polymer composition.

In accordance with the present disclosure, at least two different polyester polymers are combined and blended together in order to produce a polymer composition having a desired balance of properties and other characteristics. The polyester polymers that may be used to formulate compositions in accordance with the present disclosure include thermoplastic polyester polymers and thermoplastic polyester elastomers. Examples of polyester polymers that may be selected in accordance with the present disclosure include polyethylene terephthalate polymers, polybutylene terephthalate polymers, thermotropic liquid crystalline polymers, polycyclohexylenedimethylene terephthalate polymers, and polyester elastomers such as copolyester elastomers. The polyester polymers selected for use in formulating a composition in accordance with the present disclosure can depend upon various factors and the end use application. For instance, polyester polymers can be selected that have different crystallization rates and/or crystallization amounts in order to produce polymer compositions having a desired balance of strength and surface appearance. In addition, various polyester polymers can be selected so as to produce a polymer composition having excellent strength characteristics in combination with excellent elastic modulus properties. In addition, polyester polymers can be selected such that one has a higher melting point than the other in order to produce a composition with chemical resistance and/or heat resistance in conjunction with one or more other properties.

In one particular embodiment, the polyester polymer composition of the present disclosure in addition to containing two or more polyester polymers also contains reinforcing fibers. The reinforcing fibers may be added in order to increase strength. A blend of polyester polymers can be used in conjunction with the reinforcing fibers in order to produce a polymer matrix for the fibers that is compatible for the particular fiber selected in a manner that optimizes strength in conjunction with flexibility or surface appearance. In an alternative embodiment, the polymer composition of the present disclosure can be formulated so as to have thermal conductive properties. In this regard, the polymer composition can be combined with at least one thermally conductive particulate material that provides the composition with thermal conductive properties when molded into a product or part. Two or more polyester polymers can be selected for use in conjunction with the thermally conductive particulate material in a manner that optimizes thermal conductivity and/or compatibility.

In the past, problems have been experienced in combining two or more polyester polymers together. In particular, polyester polymers have a tendency to react with each other in an adverse manner. For instance, transesterification reactions can occur between two or more polyester polymers. In particular embodiments, the present disclosure is also directed to preventing or inhibiting chemical reactions from occurring between the different polymers. In this regard, in one embodiment, the composition can contain a compatibilizing agent. A compatibilizing agent can be selected, for instance, that is heat resistant so that the compatibilizing agent can remain active during polymer processing. In one embodiment, for instance, the compatibilizing agent may comprise a phosphorus compound. The phosphorus compound can prevent or inhibit transesterification reactions.

The polymer compositions of the present disclosure are well suited to being formed into various different polymer articles, including parts and products. In one embodiment, for instance, the polymer composition may be used to produce automotive parts, such as housings, consumer appliance parts and products, compact camera modules, lighting products, such as headlamps and other LED assemblies, and the like.

Various different polyester polymers may be used in accordance with the present disclosure and combined together to form a polymer composition. Polyester polymers that may be used in accordance with the present disclosure include polyalkylene terephthalate polymers including copolymers. Such polymers include, for instance, polyethylene terephthalate polymers, polybutylene terephthalate polymers, and respective copolymers. Other polyester polymers that may be used include polycyclohexylenedimethylene terephthalate polymers, thermotropic liquid crystalline polymers, and polyester elastomers such as copolyester elastomers.

Polyalkylene terephthalate polymers suitable for use herein are derived from an aliphatic or cycloaliphatic diol, or mixtures thereof, containing from 2 to about 10 carbon atoms and an aromatic dicarboxylic acid.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl) ethane, 4,4'-dicarboxydiphenyl ether, etc., and mixtures of these. All of these acids contain at least one aromatic nucleus. Fused rings can also be present such as in 1,4- or 1,5- or 2,6-naphthalene-dicarboxylic acids. In one embodiment, the dicarboxylic acid is terephthalic acid or mixtures of terephthalic and isophthalic acid.

Particular polyalkylene terephthalate polymers well suited for use in the present disclosure are polyethylene terephthalate polymers and polybutylene terephthalate polymers. In addition, modified or copolymers of polyethylene terephthalate polymers and/or polybutylene terephthalate polymers may be used. For instance, in one embodiment, a modifying acid or a modifying diol may be used to produce modified polyethylene terephthalate polymers and/or modified polybutylene terephthalate polymers.

As used herein, the terms "modifying acid" and "modifying diol" are meant to define compounds, which can form part of the acid and diol repeat units of a polyester, respectively, and which can modify a polyester to reduce its crystallinity or render the polyester amorphous. In one embodiment, however, the polyesters present in the polymer composition of the present disclosure are non-modified and do not contain a modifying acid or a modifying diol.

Examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, and the like. In practice, it is often preferable to use a functional acid derivative thereof such as the dimethyl, diethyl, or dipropyl ester of the dicarboxylic acid. The anhydrides or acid halides of these acids also may be employed where practical. Preferred is isophthalic acid.

Examples of modifying diol components may include, but are not limited to, neopentyl glycol, 1,4-cyclohexanedimethanol, 1,2-propanediol, 1,3-propanediol, 2-Methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-Bis(2-hydroxyethoxy)benzene, 4,4'-Bis(2-hydroxyethoxy) diphenylether [Bis-hydroxyethyl Bisphenol A], 4,4'-Bis(2-hydroxyethoxy)diphenylsulfide [Bis-hydroxyethyl Bisphenol S] and diols containing one or more oxygen atoms in the chain, e.g. diethylene glycol, triethylene glycol, dipropylene glycol, tripropylene glycol, and the like. In general, these diols contain 2 to 18, preferably 2 to 8 carbon atoms. Cycloalphatic diols can be employed in their cis or trans configuration or as mixtures of both forms.

Other suitable low melt processing polyesters are based on polyaddition of lactones, for example poly-ε-caprolacton.

In one embodiment, the polymer composition contains a poly(1,4-cyclohexanedimethanol terephthalate) polymer, which is typically referred to as a "PCT" polymer. Poly(1,4-cyclohexanedimethanol terephthalate) is a polyester that contains repeat units from a dicarboxylic acid component and a glycol component. At least about 80 mol percent, more preferably at least about 90 mol percent, and especially preferably all of the diol repeat units are derived from 1,4-cyclohexanedimethanol and are of formula (I).

(I)

At least about 80 mol percent, more preferably at least about 90 mol percent, and especially preferably all of the dicarboxylic acid repeat units are derived from terephthalic acid and are of formula (II).

(II)

In one embodiment, the PCT polymer contains 100 mol percent of terephthalic acid or diesters. The glycol component, on the other hand, can contain a total of 100 mol percent 1,4-cyclohexanedimethanol.

In various embodiments, however, the dicarboxylic acid component may contain up to 10 mol percent of other aromatic, aliphatic, or alicyclic dicarboxylic acids such as isophthalic acid, naphthalenedicarboxylic acid, cyclohexanedicarboxylic acid, succinic acid, subacic acid, adipic acid, glutaric acid, azelaic acid, and the like.

The glycol component may also contain up to about 10 mol percent of other aliphatic or alicyclic glycols, such as diethylene glycol, triethylene glycol, ethylene glycol, propanediol, butanediol, pentanediol, hexanediol, and the like.

The PCT polymer can have an inherent viscosity (I.V.) of from about 0.3 to about 1.5 and a melting point of at least 260° C.

In one embodiment, the PCT polymer can comprise a blend of two or more different grades of PCT polymers. For instance, in one embodiment, a blend, such as a 1:1 blend, of high I.V. PCT polymer with a low I.V. PCT polymer may be used. In an alternative embodiment, a blend, such as a 2:1 blend, may be used that includes a PCT polymer wherein the dicarboxylic acid component is 100 mol percent terephthalic acid and a PCT polymer in which the dicarboxylic acid component is 90 mol percent terephthalic acid and 10 mol percent isophthalic acid.

In still another embodiment, the thermoplastic polymer composition may comprise a wholly aromatic polyester, which may be a thermotropic liquid crystalline polymer that contains aromatic ester repeating units generally represented by the following Formula (I):

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O), wherein at least one of $Y_1$ and $Y_2$ are C(O).

Examples of aromatic ester repeating units that are suitable for use in the present invention may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), or 2,6-naphthalenedicarboxylic acid ("NDA"). When employed, repeating units derived from aromatic dicarboxylic acids (e.g., IA, TA, and/or NDA) typically constitute from about 1 mol. % to about 60 mol. %, in some embodiments from about 2 mol. % to about 55 mol. %, and in some embodiments, from about 10 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. One particularly suitable aromatic hydroxycarboxylic acid is 4-hydroxybenzoic acid ("HBA"). When employed, repeating units derived from hydroxycarboxylic acids (e.g., HBA) typically constitute from about 5 mol. % to about 80 mol. %, in some embodiments from about 10 mol. % to about 80 mol. %, and in some embodiments, from about 20 mol. % to about 70% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 35 mol. %, in some embodiments from about 2 mol. % to about 30 mol. %, and in some embodiments, from about 5 mol. % to about 25% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids (e.g., cyclohexane dicarboxylic acid), diols, amides, amines, etc. Of course, in other embodiments, the polymer may be "wholly aromatic" in that it lacks repeating units derived from non-aromatic (e.g., aliphatic or cycloaliphatic) monomers.

In one particular embodiment, for example, the polymer may be formed from repeating units derived from HBA and TA and/or IA, as well as various other optional constituents. The repeating units derived from HBA may constitute from about 10 mol. % to about 80 mol. %, in some embodiments from about 30 mol. % to about 75 mol. %, and in some embodiments, from about 45 mol. % to about 70 mol. % of the polymer. The repeating units derived from TA and/or IA may likewise constitute from about 5 mol. % to about 40 mol. %, in some embodiments from about 10 mol. % to about 35 mol. %, and in some embodiments, from about 15 mol. % to about 35 mol. % of the polymer. Repeating units may also be employed that are derived from BP and/or HQ in an amount from about 1 mol. % to about 30 mol. %, in some embodiments from about 2 mol. % to about 25 mol. %, and in some embodiments, from about 5 mol. % to about 20 mol. % of the polymer. Other possible repeating units may include those derived from HNA, NDA, and/or APAP. For example, repeating units derived from HNA, NDA, and/or APAP may each constitute from about 1 mol. % to about 35 mol. %, in some embodiments from about 2 mol. % to about 30 mol. %, and in some embodiments, from about 3 mol. % to about 25 mol. % when employed.

Regardless of the particular constituents and nature of the polymer, the aromatic polyester may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming the aromatic polyester may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

In one embodiment, one of the polyesters may comprise a thermoplastic polyester elastomer. For example, the polymer composition may contain a copolyester elastomer such as a segmented thermoplastic copolyester. The thermoplastic polyester elastomer, for example, may comprise a multi-block copolymer. Useful segmented thermoplastic copolyester elastomers include a multiplicity of recurring long chain ester units and short chain ester units joined head to tail through ester linkages. The long chain units can be represented by the formula and the short chain units can be represented by the formula where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 15 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600, such as from about 600-6000, a melting point less than about 55° C. and a carbon to oxygen ratio about 2.0 or greater. The long chain glycols are generally poly(alkylene oxide) glycols or glycol esters of poly(alkylene oxide) dicarboxylic acids. Any substituent groups can be present which do not interfere with polymerization of the compound with glycol(s) or dicarboxylic acid(s), as the case may be. The hydroxy functional groups of the long chain glycols which react to form the copolyesters can be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The dicarboxylic acids may include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers for the elastomer have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralenedicarboxylic acid, anthralenedicarboxylic acid, 4,4'-sulfonyl dibenzoic acid, etc. and $C_1$-$C_{10}$ alkyl and other ring substitution derivatives thereof such as halo, alkoxy or aryl derivatives. Hydroxy acids such as p(β-hydroxyethoxy) benzoic acid can also be used providing an aromatic dicarboxylic acid is also present.

Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylenedicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate.

The dicarboxylic acid may have a molecular weight less than about 300. In one embodiment, phenylene dicarboxylic acids are used such as terephthalic and isophthalic acid.

Included among the low molecular (less than about 250) diols which react to form short chain ester units of the copolyesters are acyclic, alicyclic and aromatic dihydroxy compounds. Included are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Also included are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). Low molecular weight diols also include such equivalent ester-forming derivatives.

Long chain glycols which can be used in preparing the polymers include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide $HOOCCH_2(OCH_2CH_2CH_2CH_2)_xOCH_2COOH$ IV can be used to form long chain glycols in situ. Polythioether glycols and polyester glycols also provide useful products. In using polyester glycols, care must generally be exercised to control a tendency to interchange during melt polymerization, but certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylenediene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure when only one low molecular weight diol (corresponding to D) is employed. When more than one diol is used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight diol is present in considerable molar excess.

In place of a single low molecular weight diol, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

As described above, the hardness of the thermoplastic elastomer can be varied by varying the amount of hard segments and soft segments. For instance, the thermoplastic elastomer can generally have a hardness of greater than about 10 Shore D, such as greater than about 15 Shore D, such as greater than about 20 Shore D. The hardness is generally less than about 70 Shore D, such as less than about 60 Shore D, such as less than about 55 Shore D, such as less than about 50 Shore D. In one embodiment, a thermoplastic polyester elastomer is used that has a Shore D hardness of from about 20 to about 45. In an alternative embodiment, a thermoplastic polyester elastomer is used that has a Shore D hardness of from about 22 to about 35. In an alternative embodiment, a thermoplastic elastomer may be used that has a Shore D hardness of from about 35 to about 47. And in another alternative embodiment, a thermoplastic elastomer may be used that has a Shore D hardness of from about 50 to about 70.

Copolyether esters with alternating, random-length sequences of either long chain or short chain oxyalkylene glycols can contain repeating high melting blocks that are capable of crystallization and substantially amorphous blocks with a relatively low glass transition temperature. In one embodiment, the hard segments can be composed of tetramethylene terephthalate units and the soft segments may be derived from aliphatic polyether and polyester glycols. Of particular advantage, the above materials resist deformation at surface temperatures because of the presence of a network of microcrystallites formed by partial crystallization of the hard segments. The ratio of hard to soft segments determines the characteristics of the material. Thus, another advantage to thermoplastic polyester elastomers is that soft elastomers and hard elastoplastics can be produced by changing the ratio of the hard and soft segments.

In one particular embodiment, the polyester thermoplastic elastomer has the following formula: $-[4GT]_x[BT]_y$, wherein 4G is butylene glycol, such as 1,4-butane diol, B is poly (tetramethylene ether glycol) and T is terephthalate, and wherein x is from about 0.60 to about 0.99 and y is from about 0.01 to about 0.40.

In general, each polyester polymer as described above can be present in the polymer composition in an amount of at least about 5% by weight, such as at least about 10% by weight, such as at least 15% by weight, such as at least 20% by weight but less than about 90% by weight, such as less than about 80% by weight, such as less than about 70% by weight, such as less than about 60% by weight.

The at least one polyester polymer or polyalkylene terephthalate polymer present in the composition can generally have an intrinsic viscosity (IV) of from about 0.5 to about 0.9 dL/g, such as from about 0.7 to about 0.9 dL/g. In one embodiment, for instance, the intrinsic viscosity of the polyester is from about 0.65 to about 0.8 dL/g.

For exemplary purposes only, the following table provides various different combinations of polyester polymers that may be used to formulate compositions in accordance with the present disclosure.

| Polyester A and/or B | Polyester C and/or D |
| --- | --- |
| Polyethylene terephthalate | Polybutylene terephthalate |
| Polyethylene terephthalate and/or polybutylene terephthalate | Polycyclohexylenedimethylene terephthalate |
| Polyethylene terephthalate and/or polybutylene terephthalate | Thermotropic liquid crystalline polymer |
| Polyethylene terephthalate and/or polybutylene terephthalate | Polyester elastomer |
| Polyethylene terephthalate and/or polybutylene terephthalate | Polyester elastomer in combination with a polycyclohexylenedimethylene terephthalate and/or a thermotropic liquid crystalline polymer |

In one particular embodiment, the polymer composition contains a first polyester polymer that has a faster crystallization rate than a second polyester polymer. The first polyester polymer, for instance, may comprise a polyethylene terephthalate polymer while the second polymer may comprise a polybutylene terephthalate polymer. For example, the polyethylene terephthalate polymer may have a faster crystallization rate but may have an overall lower crystallinity than the polybutylene terephthalate polymer.

Combining a polyester polymer having a faster crystallization rate than a second polyester polymer may provide various advantages and benefits. For example, combining a polyester polymer with a faster crystallization rate than a second polyester polymer may create molded articles having a higher gloss surface with better aesthetics and appeal. Although unknown, it is believed that the slower crystallizing polyester polymer has a tendency to form a greater proportion of the surface of a molded article than the faster crystallizing polyester polymer. The faster crystallizing polyester polymer, on the other hand, may combine with the other polyester polymer to improve at least one physical characteristic, such as strength and/or modulus.

The relative amounts of the first polyester polymer having the lower crystallization rate (such as a polyethylene terephthalate polymer) and the second polyester polymer having the higher crystallinity rate (such as a polybutylene terephthalate polymer) can vary depending upon numerous factors including the end use application. In one embodiment, for instance, the first polyester polymer may be present in lesser amounts than the second polyester polymer. For example, the weight ratio between the first polyester polymer and the second polyester polymer can be from about 1:1 to about 1:10, such as from about 1:2 to about 1:5, such as from about 1:2.5 to about 1:4. In one particular embodiment, for instance, a polyethylene terephthalate polymer may be present in combination with a polybutylene terephthalate polymer at a weight ratio of from about 1:2 to about 1:4.

The polymer composition of the present disclosure can have a desired balance of properties. For instance, the polymer composition can have a tensile strength of greater than about 100 MPa, such as greater than about 110 MPa, such as greater than about 120 MPa, such as greater than about 125 MPa. The tensile strength of the polymer composition is generally less than about 350 MPa. The polymer composition can have a tensile modulus of greater than about 10,000 MPa, such as greater than about 11,000 MPa, such as greater than about 12,000 MPa, such as greater than about 13,000 MPa. The tensile modulus is generally less than about 40,000 MPa, such as less than about 35,000 MPa. Of particular advantage, the polymer composition can have the above tensile strength and tensile modulus properties while having desired elongation properties. For instance, the polymer composition may display an elongation at break of greater than about 1%, such as greater than about 1.1%, such as greater than about 1.3%, such as greater than about 1.5%. The elongation at break is generally less than about 10%, such as less than about 8%.

The polymer composition can also have excellent impact resistance. For instance, when tested according to the notched Charpy test at 23° C., the polymer composition may have an impact resistance of at least about 6 kJ/m$^2$, such as at least about 7 kJ/m$^2$, such as at least about 8 kJ/m$^2$, such as at least about 10 kJ/m$^2$, such as at least about 15 kJ/m$^2$, such as at least about 20 kJ/m$^2$ (generally less than 65 kJ/m$^2$, such as less than 60 kJ/m$^2$). It has been surprisingly found that when a less crystalline polyester is incorporated into a composition including a more crystalline polyester and fibers, the impact strength is improved.

In addition to excellent physical properties as described above, molded products made from the polymer composition can also have excellent aesthetic and/or light reflective properties. For instance, molded products made in accordance with the present disclosure can include an exterior surface having a glossiness of greater than about 30%, such as greater than about 40%, such as greater than about 50%, such as even greater than about 60% when measured at an angle of incidence of 60°. Glossiness can be measured using a gloss meter. For instance, the gloss meter may comprise a gloss meter entitled Micro Tri Gloss having category number 4431 and manufactured by BYK Gardner.

As described above, in one embodiment, the polymer composition of the present disclosure can contain a compatibilizing agent. The compatibilizing agent can be added in order to prevent adverse reactions from occurring between the polyester polymers contained in the composition. For example, it is believed that the compatibilizing agent can prevent transesterification reactions. In one embodiment, the compatibilizing agent may comprise a phosphorus compound, such as an organophosphorus compound. For instance, the phosphorus compound may comprise a phosphite, such as a pentaerythritol diphosphite.

Organophosphorus compounds may be employed in the composition that may serve as compatibilizing agents to also decompose peroxides and hydroperoxides into stable, non-radical products. Trivalent organophosphorous compounds (e.g., phosphites or phosphonites) are particularly useful. Monophosphite compounds (La, only one phosphorus atom per molecule) may be employed in certain embodiments of the present invention. Preferred monophosphites are aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents). Non-limiting examples of suitable aryl monophosphites (or monophosphonites) may include triphenyl phosphite; diphenyl alkyl phosphites; phenyl dialkyl phosphites; tris(nonylphenyl) phosphite; tris(2,4-di-tert-butylphenyl) phosphite; bis(2,4-di-tert-butyl-6-methylphenyl)ethyl phosphite; and 2,2',2"-nitrilo[triethyltris(3,3'5,5'-tetra-tert-butyl-1,1'-biphenyl-2,2'-diyl) phosphate. Aryl diphosphites or diphosphonites (i.e., contains at least two phosphorus atoms per phosphite molecule) may also be employed in the composition and may include, for instance, distearyl pentaerythritol diphosphite, diisodecyl pentaerythritol diphosphite, bis(2,4 di-tert-butylphenyl) pentaerythritol diphosphite; bis(2,6-di-tert-butyl-4-methylpenyl)pentaerythritol diphosphite; bisisodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tetrakis(2,4-di-tert-butylphenyl)4,4'-biphenylene-diphosphonite and bis(2,4-dicumylphenyl)pentaerythritol diphosphite.

Organophosphorous compounds may constitute from about 0.01 wt. % to about 2 wt. %, in some embodiments from about 0.05 wt. % to about 1 wt. % and in some embodiments, from about 0.1 wt, % to about 0.5 wt. % of the polymer composition.

Reinforcing Fibers

In one embodiment, the polymer composition may contain reinforcing fibers.

Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glassfiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polymer matrix, for example in an extruder or kneader.

According to one embodiment, the molding composition of the present disclosure comprises at least one reinforcing fiber which is a mineral fiber, preferably a glass fiber, more preferably a coated or impregnated glass fiber. Glass fibers which are suitable for the molding composition of the present disclosure are commercially available, e.g. Johns Manville, ThermoFlow®Chopped Strand 753, OCV Chopped Strand 408 A, Nippon Electric Glass Co. (NEG) Chopped Strand T-651.

Fiber diameters can vary depending upon the particular fiber used and whether the fiber is in either a chopped or a continuous form. The fibers, for instance, can have a diameter of from about 5 μm to about 100 μm, such as from about 5 μm to about 50 μm, such as from about 5 μm to about 15 μm. The length of the fibers can vary depending upon the particular application. For instance, the fibers can have a length of greater than about 100 microns, such as greater than about 200 microns, such as greater than about 300 microns, such as greater than about 350 microns. The length of the fibers can generally be less than about 1,000 microns, such as less than about 800 microns, such as less than about 600 microns, such as less than about 500 microns. Once incorporated into the polymer composition and molded into an article, the fiber length can decrease. For instance, the average fiber length in the final product can be from about 100 microns to about 400 microns, such as from about 100 microns to about 300 microns.

Thermally Conductive Particulate Material

In one embodiment, the polymer composition of the present disclosure can contain a thermally conductive particulate material. The thermally conductive particulate material may be added in conjunction with reinforcing fibers.

The thermally conductive particulate material employed in the polymer composition generally has a high specific surface area. The specific surface area may be, for example, about 0.5 $m^2/g$ or more, in some embodiments about 1 $m^2/g$ or more, and in some embodiments, from about 2 to about 40 $m^2/g$. The specific surface area can be determined according to standard methods such as by the physical gas adsorption method (B.E.T. method) with nitrogen as the adsorption gas, as is generally known in the art and described by Brunauer, Emmet, and Teller (J. Amer. Chem. Soc., vol. 60, February, 1938, pp. 309-319). The particulate material may also have a powder tap density of from about 0.2 to about 1.0 $g/cm^3$, in some embodiments from about 0.3 to about 0.9 $g/cm^3$, and in some embodiments, from about 0.4 to about 0.8 $g/cm^3$, such as determined in accordance with ASTM B527-15.

The thermally conductive particulate material also has a high intrinsic thermal conductivity, such as about 50 W/m-K or more, in some embodiments about 100 W/m-K or more, and in some embodiments, about 150 W/m-K or more. Examples of such materials may include, for instance, boron nitride (BN), aluminum nitride (AlN), magnesium silicon nitride ($MgSiN_2$), graphite (e.g., expanded graphite), silicon carbide (SiC), carbon nanotubes, carbon black, metal oxides (e.g., zinc oxide, magnesium oxide, beryllium oxide, zirconium oxide, yttrium oxide, etc.), metallic powders (e.g., aluminum, copper, bronze, brass, etc.), etc., as well as combinations thereof. Boron nitride or graphite are particularly suitable for use in the polymer composition of the present invention.

As noted above, the particulate material has an average size (e.g., diameter) of about 1 to about 100 micrometers, in some embodiments from about 10 to about 90 micrometers, in some embodiments, from about 20 to about 80 micrometers, and in some embodiments, from about 30 to about 60 micrometers. In certain embodiments, the thermally conductive particulate material may be in the form of individual platelets having the desired size.

The thermally conductive particulate material can be generally present in the composition in an amount greater than about 1% by weight, such as in an amount greater than about 3% by weight, such as in an amount greater than about 5% by weight, such as in an amount greater than about 8% by weight, such as in an amount greater than about 10% by weight. The thermally conductive particulate material is generally present in an amount less than about 40% by weight, such as in an amount less than about 30% by weight, such as in an amount less than about 20% by weight, such as in an amount less than about 10% by weight.

Other Additives

The polymer composition of the present disclosure can contain various other additives. For example; the composition may further include a nucleating agent, present in a concentration of between about 0.1 and 2% by weight, preferably between about 0.001% and 0.5% based on the total weight of the composition. The nucleating agent can be selected from the group consisting of alkali metal salts having anions which are oxides of the elements from Group IV of the Periodic Table; barium sulfate; and talc.

The polymer composition may also contain at least one stabilizer. The stabilizer may comprise an antioxidant, a light stabilizer such as an ultraviolet light stabilizer, a thermal stabilizer, and the like.

Sterically hindered phenolic antioxidant(s) may be employed in the composition. Examples of such phenolic antioxidants include, for instance, calcium bis(ethyl 3,5-di-tert-butyl-4-hydroxybenzylphosphonate) (Irganox® 1425); terephthalic acid, 1,4-dithio-S,S-bis(4-tert-butyl-3-hydroxy-2,6-dimethylbenzyl) ester (Cyanox® 1729); triethylene glycol bis(3-tert-butyl-4-hydroxy-5-methylhydrocinnamate); hexamethylene bis(3,5-di-tert-butyl-4-hydroxyhydrocinnamate (Irganox® 259); 1,2-bis(3,5,di-tert-butyl-4-hydroxy-hydrocinnamoyl)hydrazide (Irganox® 1024); 4,4'-di-tert-octyldiphenamine (Naugalube® 438R); phosphonic acid, (3,5-di-tert-butyl-4-hydroxybenzyl)-,dioctadecyl ester (Irganox® 1093); 1,3,5-trimethyl-2,4,6-tris(3',5'-di-tert-butyl-4' hydroxybenzyl)benzene (Irganox® 1330); 2,4-bis(octylthio)-6-(4-hydroxy-3,5-di-tert-butylanilino)-1,3,5-triazine (Irganox® 565); isooctyl 3-(3,5-di-tert-butyl-4-hydroxyphenyl)propionate (Irganox® 1135); octadecyl 3-(3,5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol) monoacrylate (Irganox® 3052); 2-tert-butyl-6-[1-(3-tert-butyl-2-hydroxy-5-methylphenyl)ethyl]-4-methylphenyl acrylate (Sumilizer® TM 4039); 2-[1-(2-hydroxy-3,5-di-tert-pentylphenyl)ethyl]-4,6-di-tert-pentylphenyl acrylate (Sumilizer® GS); 1,3-dihydro-2H-Benzimidazole (Sumilizer® MB); 2-methyl-4,6-bis[(octylthio)methyl]phenol (Irganox® 1520); N,N'-trimethylenebis-[3-(3,5-di-tert-butyl-4-hydroxyphenyl)propionamide (Irganox® 1019); 4-n-octadecyloxy-2,6-diphenylphenol (Irganox® 1063); 2,2'-ethylidenebis[4,6-di-tert-butylphenol] (Irganox® 129); N N'-hexamethylenebis(3,5-di-tert-butyl-4-hydroxyhydrocinnamamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1-napthalenamine (Irganox® L 05); tris[2-tert-butyl-4-(3-tert-butyl-4-hydroxy-6-methylphenylthio)-5-methyl phenyl] phosphite (Hostanox® OSP 1); zinc dinonyidithiocarbamate (Hostanox® VP-ZNCS 1); 3,9-bis[1,1-dimethyl-2-[(3-tert-butyl-4-hydroxy-5-methylphenyl)propionyloxy]ethyl]-2,4, 8,10-tetraoxaspiro[5,5]undecane (Sumilizer® AG80); pentaerythrityl tetrakis[3-(3,5-di-tert-butyl-4-hydroxyphenyl) propionate] (Irganox® 1010); ethylene-bis(oxyethylene)bis

[3-(5-tert-butyl-4-hydroxy-m-tolyl)-propionate (Irganox® 245); 3,5-di-tert-butyl-4-hydroxytoluene (Lowinox BHT, Chemtura) and so forth.

Some examples of suitable sterically hindered phenolic antioxidants for use in the present composition are triazine antioxidants having the following general formula:

wherein, each R is independently a phenolic group, which may be attached to the triazine ring via a $C_1$ to $C_5$ alkyl or an ester substituent. Preferably, each R is one of the following formula (I)-(III):

Commercially available examples of such triazine-based antioxidants may be obtained from American Cyanamid under the designation Cyanox® 1790 (wherein each R group is represented by the Formula III) and from Ciba Specialty Chemicals under the designations Irganox® 3114 (wherein each R group is represented by the Formula I) and Irganox® 3125 (wherein each R group is represented by the Formula II).

Sterically hindered phenolic antioxidants may constitute from about 0.01 wt. % to about 3 wt. %, in some embodiments from about 0.05 wt. % to about 1 wt. %, and in some embodiments, from about 0.05 wt. % to about 0.1 wt. % of the entire stabilized polymer composition. In one embodiment, for instance, the antioxidant comprises pentaerythrityl tetrakis[3-(3,5-di-tert-butyl-4-hydroxyphenyl)propionate.

Hindered amine light stabilizers ("HALS") may be employed in the composition to inhibit degradation of the polyester composition and thus extend its durability. Suitable HALS compounds may be derived from a substituted piperidine, such as alkyl-substituted piperidyl; piperidinyl, piperazinone, alkoxypiperidinyl compounds, and so forth. For example, the hindered amine may be derived from a 2,2,6,6-tetraalkylpiperidinyl. Regardless of the compound from which it is derived, the hindered amine is typically an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit.

Without intending to be limited by theory, it is believed that high molecular weight hindered amines are relatively thermostable and thus able to inhibit light degradation even after being subjected to extrusion conditions. One particularly suitable high molecular weight hindered amine has the following general structure:

wherein, p is 4 to 30, in some embodiments 4 to 20, and in some embodiments 4 to 10. This oligomeric compound is commercially available from Clariant under the designation Hostavin® N30 and has a number average molecular weight of 1200.

Another suitable high molecular weight hindered amine has the following structure:

wherein, n is from 1 to 4 and $R_{30}$ is independently hydrogen or $CH_3$. Such oligomeric compounds are commercially available from Adeka Palmarole SAS (joint venture between Adeka Corp. and Palmarole Group) under the designation ADK STAB® LA-63 ($R_{30}$ is $CH_3$) and ADK STAB® LA-68 ($R_{30}$ is hydrogen).

Other examples of suitable high molecular weight hindered amines include, for instance, an oligomer of N-(2-hydroxyethyl)-2,2,6,6-tetramethyl-4-piperidinol and succinic acid (Tinuvin® 622 from Ciba Specialty Chemicals, MW=4000); oligomer of cyanuric acid and N,N-di(2,2,6,6-tetramethyl-4-piperidyl)-hexamethylene diamine; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346 from Cytec, MW=1600); polymethylpropyl-3-oxy-[4(2,2,6,6-tetramethyl)-piperidinylysiloxane (Uvasil® 299 from Great Lakes Chemical, MW-1100 to 2500); copolymer of α-methylstyrene-N-(2,2,6,6-tetramethyl-4-piperidinyl)maleimide and N-stearyl maleimide; 2,4,8,10-tetraoxaspiro[5.5]undecane-3,9-diethanol tetramethyl-polymer with 1,2,3,4-butanetetracarboxylic acid; and so forth. Still other suitable high molecular weight hindered amines are described in U.S. Pat. No. 5,679,733 to Malik, et al, and U.S. Pat. No. 6,414,155 to Sassi, et al., which are incorporated herein in their entirety by reference thereto for all purposes.

In addition to the high molecular hindered amines, low molecular weight hindered amines may also be employed in the composition. Such hindered amines are generally monomeric in nature and have a molecular weight of about 1000 or less, in some embodiments from about 155 to about 800, and in some embodiments, from about 300 to about 800.

Specific examples of such low molecular weight hindered amines may include, for instance, bis-(2,2,6,6-tetramethyl-4-piperidyl) sebacate (Tinuvin® 770 from Ciba Specialty Chemicals, MW=481); bis-(1,2,2,6,6-pentamethyl-4-piperidinyl)-(3,5-ditert.butyl-4-hydroxybenzyl)butyl-propane dioate; bis-(1,2,2,6,6-pentamethyl-4-piperidinyl)sebacate; 8-acetyl-3-dodecyl-7,7,9,9-tetramethyl-1,3,8-triazaspiro-(4,5)-decane-2,4-dione, butanedioic acid-bis-(2,2,6,6-tetramethyl-4-piperidinyl) ester; tetrakis-(2,2,6,6-tetramethyl-4-piperidyl)-1,2,3,4-butane tetracarboxylate; 7-oxa-3,20-diazadispiro(5.1.11.2) heneicosan-20-propanoic acid, 2,2,4,4-tetramethyl-21-oxo, dodecyl ester; N-(2,2,6,6-tetramethyl-4-piperidinyl)-N', amino-oxamide; o-t-amyl-o-(1,2,2,6,6-pentamethyl-4-piperidinyl)-monoperoxicarbonate; β-alanine, N-(2,2,6,6-tetramethyl-4-piperidinyl), dodecylester; ethanediamide, N-(1-acetyl-2,2,6,6-tetramethylpiperidinyl)-N'-dodecyl; 3-dodecyl-1-(2,2,6,6-tetramethyl-4-piperidinyl)-pyrrolidin-2,5-dione; 3-dodecyl-1-(1,2,2,6,6-pentamethyl-4-piperidinyl)-pyrrolidin-2,5-dione; 3-dodecyl-1-(1-acetyl,2,2,6,6-tetramethyl-4-piperidinyl)-pyrrolidin-2,5-dione, (Sanduvar® 3058 from Clariant, MW=448.7); 4-benzoyloxy-2,2,6,6-tetramethylpiperidine; 1-[2-(3,5-di-tert-butyl-4-hydroxyphenylpropionyloxy) ethyl]-4-(3,5-di-tert-butyl-4-hydroxylphenyl propionyloxy)-2,2,6,6-tetramethyl-piperidine; 2-methyl-2-(2",2",6",6"-tetramethyl-4"-piperidinylamino)-N-(2',2',6',6'-tetra-methyl-4'-piperidinyl)propionylamide; 1,2-bis-(3,3,5,5-tetramethyl-2-oxo-piperazinyl)ethane; 4-oleoyloxy-2,2,6,6-tetramethylpiperidine; and combinations thereof. Other suitable low molecular weight hindered amines are described in U.S. Pat. No. 5,679,733 to Malik, et al.

The hindered amines may be employed singularly or in combination in any amount to achieve the desired properties, but typically constitute from about 0.01 wt. % to about 4 wt. % of the polymer composition.

UV absorbers, such as benzotriazoles or benzopheones, may be employed in the composition to absorb ultraviolet light energy. Suitable benzotriazoles may include, for instance, 2-(2-hydroxyphenyl)benzotriazoles, such as 2-(2-hydroxy-5-methylphenyl)benzotriazole; 2-(2-hydroxy-5-tert-octylphenyl)benzotriazole (Cyasorb® UV 5411 from Cytec); 2-(2-hydroxy-3,5-di-tert-butylphenyl)-5-chlorobenzo-triazole; 2-(2-hydroxy-3-tert-butyl-5-methylphenyl)-5-chlorobenzotriazole; 2-(2-hydroxy-3,5-dicumylphenyl)benzotriazole; 2,2'-methylenebis(4-tert-octyl-6-benzotriazolylphenol); polyethylene glycol ester of 2-(2-hydroxy-3-tert-butyl-5-carboxyphenyl)benzotriazole; 2-[2-hydroxy-3-(2-acryloyloxyethyl)-5-methylphenyl]-benzotriazole; 2-[2-hydroxy-3-(2-methacryloyloxyethyl)-5-tert-butylphenyl]benzotriazole; 2-[2-hydroxy-3-(2-methacryloyloxyethyl)-5-tert-octylphenyl]benzotriazole; 2-[2-hydroxy-3-(2-methacryloyloxyethyl)-5-tert-butylphenyl]-5-chlorobenzotriazole; 2-[2-hydroxy-5-(2-methacryloyloxyethyl)phenyl]benzotriazole; 2-[2-hydroxy-3-tert-butyl-5-(2-methacryloyloxyethyl)phenyl]benzotriazole; 2-[2-hydroxy-3-tert-amyl-5-(2-methacryloyloxyethyl)phenyl]benzotriazole; 2-[2-hydroxy-3-tert-butyl-5-(3-methacryloyloxypropyl)phenyl]-5-chlorobenzotriazole; 2-[2-hydroxy-4-(2-methacryloyloxymethyl)phenyl]benzotriazole; 2-[2-hydroxy-4-(3-methacryloyloxy-2-hydroxypropyl)phenyl] benzotriazole; 2-[2-hydroxy-4-(3-methacryloyloxypropyl) phenyl]benzotriazole; and combinations thereof.

Exemplary benzophenone light stabilizers may likewise include 2-hydroxy-4-dodecyloxybenzophenone; 2,4-dihydroxybenzophenone; 2-(4-benzoyl-3-hydroxyphenoxy) ethyl acrylate (Cyasorb® UV 209 from Cytec); 2-hydroxy-4-n-octyloxy)benzophenone (Cyasorb® 531 from Cytec); 2,2'-dihydroxy-4-(octyloxy)benzophenone (Cyasorb® UV 314 from Cytec); hexadecyl-3,5-bis-tert-butyl-4-hydroxybenzoate (Cyasorb® UV 2908 from Cytec); 2,2'-thiobis(4-tert-octylphenolato)-n-butylamine nickel(II) (Cyasorb®) UV 1084 from Cytec); 3,5-di-tert-butyl-4-hydroxybenzoic acid, (2,4-di-tert-butylphenyl)ester (Cyasorb® 712 from Cytec); 4,4'-dimethoxy-2,2'-dihydroxybenzophenone (Cyasorb® UV 12 from Cytec); and combinations thereof.

When employed, UV absorbers may constitute from about 0.01 wt. % to about 4 wt. % of the entire polymer composition.

In one embodiment, the polymer composition may contain a blend of stabilizers that produce ultraviolet resistance and color stability. The combination of stabilizers may allow for products to be produced that have bright and fluorescent colors. In addition, bright colored products can be produced without experiencing significant color fading over time. In one embodiment, for instance, the polymer composition may contain a combination of a benzotriazole light stabilizer and a hindered amine light stabilizer, such as an oligomeric hindered amine.

If desired, fatty acid esters may be present as lubricants. Fatty acid esters may be obtained by oxidative bleaching of a crude natural wax and subsequent esterification of the fatty acids with an alcohol. The alcohol typically has 1 to 4 hydroxyl groups and 2 to 20 carbon atoms. When the alcohol is multifunctional (e.g., 2 to 4 hydroxyl groups), a carbon atom number of 2 to 8 is particularly desired. Particularly suitable multifunctional alcohols may include dihydric alcohol (e.g., ethylene glycol, propylene glycol, butylene glycol, 1,3-propanediol, 1,4-butanediol, 1,6-hexanediol and 1,4-cyclohexanediol), trihydric alcohol (e.g., glycerol and trimethylolpropane), tetrahydric alcohols (e.g., pentaerythritol and erythritol), and so forth. Aromatic alcohols may also be suitable, such as o-, m- and p-tolylcarbinol, chlorobenzyl alcohol, bromobenzyl alcohol, 2,4-dimethylbenzyl alcohol, 3,5-dimethylbenzyl alcohol, 2,3,5-cumobenzyl alcohol, 3,4,5-trimethylbenzyl alcohol, p-cuminyl alcohol, 1,2-phthalyl alcohol, 1,3-bis(hydroxymethyl)benzene, 1,4-bis(hydroxymethyl)benzene, pseudocumenyl glycol, mesitylene glycol and mesitylene glycerol. Particularly suitable fatty acid esters for use in the present invention are derived from montanic waxes. Licowax® OP (Clariant), for instance, contains montanic acids partially esterified with butylene glycol and montanic acids partially saponified with calcium hydroxide. Thus, Licowax® OP contains a mixture of montanic acid esters and calcium montanate. Other montanic acid esters that may be employed include Licowax® E, Licowax® OP, and Licolub® WE 4 (all from Clariant), for instance, are montanic esters obtained as secondary products from the oxidative refining of raw montan wax. Licowax® E and Licolub®WE 4 contain montanic acids esterified with ethylene glycol or glycerine, Still other suitable montan wax derivatives may be described in U.S. Pat. No. 5,096,951, as well as in U.S. Patent Application Publication Nos, 2007/0073007; 2006/0100330; and 2004/0254280, all of which are incorporated herein in their entirety by reference thereto for all purposes.

Other known waxes may also be employed in a lubricant. Amide waxes, for instance, may be employed that are formed by reaction of a fatty acid with a monoamine or diamine (e.g., ethylenediamine) having 2 to 18, especially 2 to 8, carbon atoms. For example, ethylenebisamide wax, which is formed by the amidization reaction of ethylene diamine and a fatty acid, may be employed. The fatty acid may be in the range from $C_{12}$ to $C_{30}$, such as from stearic acid ($C_{18}$ fatty acid) to form ethylenebisstearamide wax. Ethylenebisstearamide wax is commercially available from Lonza, Inc, under the designation Acrawax® C, which has a discrete melt temperature of 142° C. Other ethylenebisamides include the bisamides formed from lauric acid, palmitic acid, oleic acid, linoleic acid, linolenic acid, oleostearic acid, myristic acid and undecalinic acid. Still other suitable amide waxes are N-(2-hydroxyethyl)12-hydroxystearamide and N,N'-(ethylene bis)12-hydroxystearamide, which are commercially available from CasChem, a division of Rutherford Chemicals LLC, under the designations Paricin® 220 and Paricin® 285, respectively.

In addition to the above components, the polymer composition may include various other ingredients. Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

Applications

Once formed, the polymer composition may be molded into a shaped part for use in a wide variety of different applications. For example, the shaped part may be molded using an injection molding process in which dried and preheated plastic granules are injected into the mold. Regardless of the technique employed, it has been discovered that the molded part of the present invention may have a relatively smooth surface, which may be represented by its surface glossiness).

The polymer composition and/or shaped molded part can be used in a variety of applications. For example, the molded part can be employed in lighting assemblies, battery systems, sensors and electronic components, portable electronic devices such as smart phones, MP3 players, mobile phones, computers, televisions, automotive parts, etc. In one particular embodiment, the molded part may be employed in a camera module, such as those commonly employed in wireless communication devices (e.g., cellular telephone). For example, the camera module may employ a base, carrier assembly mounted on the base, a cover mounted on the carrier assembly, etc. The base may have a thickness of about 500 micrometers or less, in some embodiments from about 10 to about 450 micrometers, and in some embodiments, from about 20 to about 400 micrometers. Likewise, the carrier assembly may have a wall thickness of about 500 micrometers or less, in some embodiments from about 10 to about 450 micrometers, and in some embodiments, from about 20 to about 400 micrometers.

Figure 1:
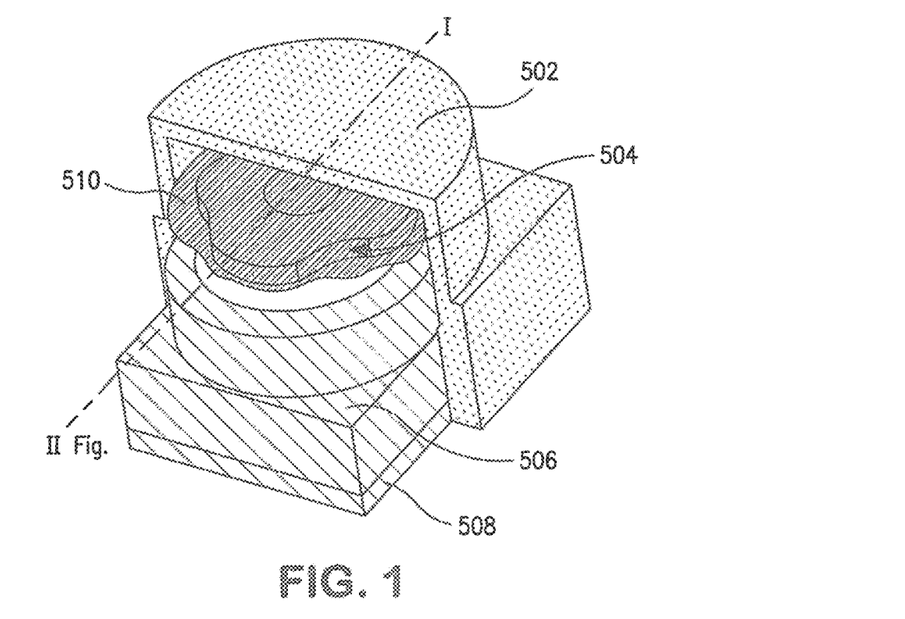
FIG. 1 is a perspective view of a compact camera module that may be formed in accordance with one embodiment of the present disclosure.
Figure 2:
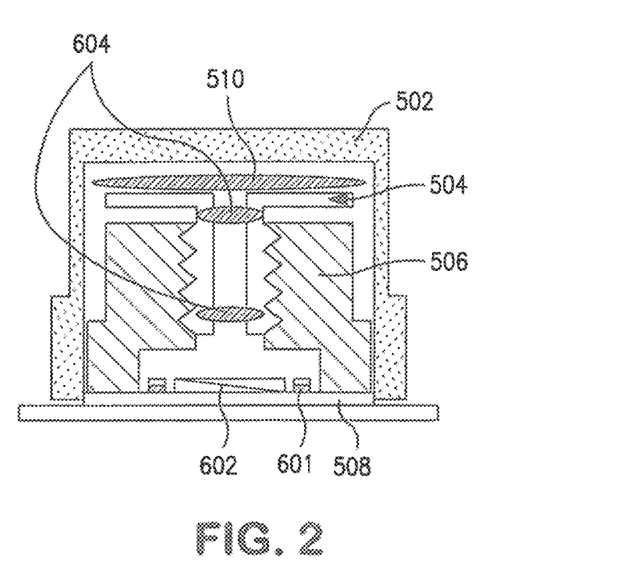
FIG. 2 is a front view of the compact camera module illustrated in FIG. 2.

One particularly suitable camera module is shown in FIGS. 1-2. As shown, a camera module 500 contains a carrier assembly 504 that overlies a base 506. The base 506, in turn, overlies an optional main board 508. Due to their relatively thin nature, the base 506 and/or main board 508 are particularly suited to be molded from the polymer composition of the present invention as described above. The carrier assembly 504 may have any of a variety of configurations as is known in the art. In one embodiment, for example, the carrier assembly 504 may contain a hollow barrel that houses one or more lenses 604, which are in communication with an image sensor 602 positioned on the main board 508 and controlled by a circuit 601. The barrel may have any of a variety of shapes, such as rectangular, cylindrical, etc. In certain embodiments, the barrel may be formed from the polymer composition of the present invention and have a wall thickness within the ranges noted above. It should be understood that other parts of the camera module may also be formed from the polymer composition of the present invention. For example, as shown, a cover may overly the carrier assembly 504 that includes, for example, a substrate 510 (e.g., film) and/or thermal insulating cap 502. In some embodiments, the substrate 510 and/or cap 502 may also be formed from the polymer composition.

The polymer composition of the present disclosure is also well suited for use in constructing light assemblies. The light assembly, for instance, may comprise an LED light assembly and/or a headlamp assembly. Of particular advantage, polymer compositions made in accordance with the present disclosure can be used for different purposes when constructing light assemblies. For instance, in one embodiment, the composition can be formulated to have thermal conductive properties. In this regard, the composition may be used to construct the housing for an LED headlamp. In one embodiment, for instance, the composition can be used to form frame members within the housing. By constructing the housing and/or the frame members from the thermally conductive composition, the lifetime of the LED headlamp will be prolonged. Polymer compositions made according to the present disclosure can also have excellent surface characteristics. Thus, the polymer composition can also be used to construct reflectors and/or housings for light assemblies.

Figure 3:
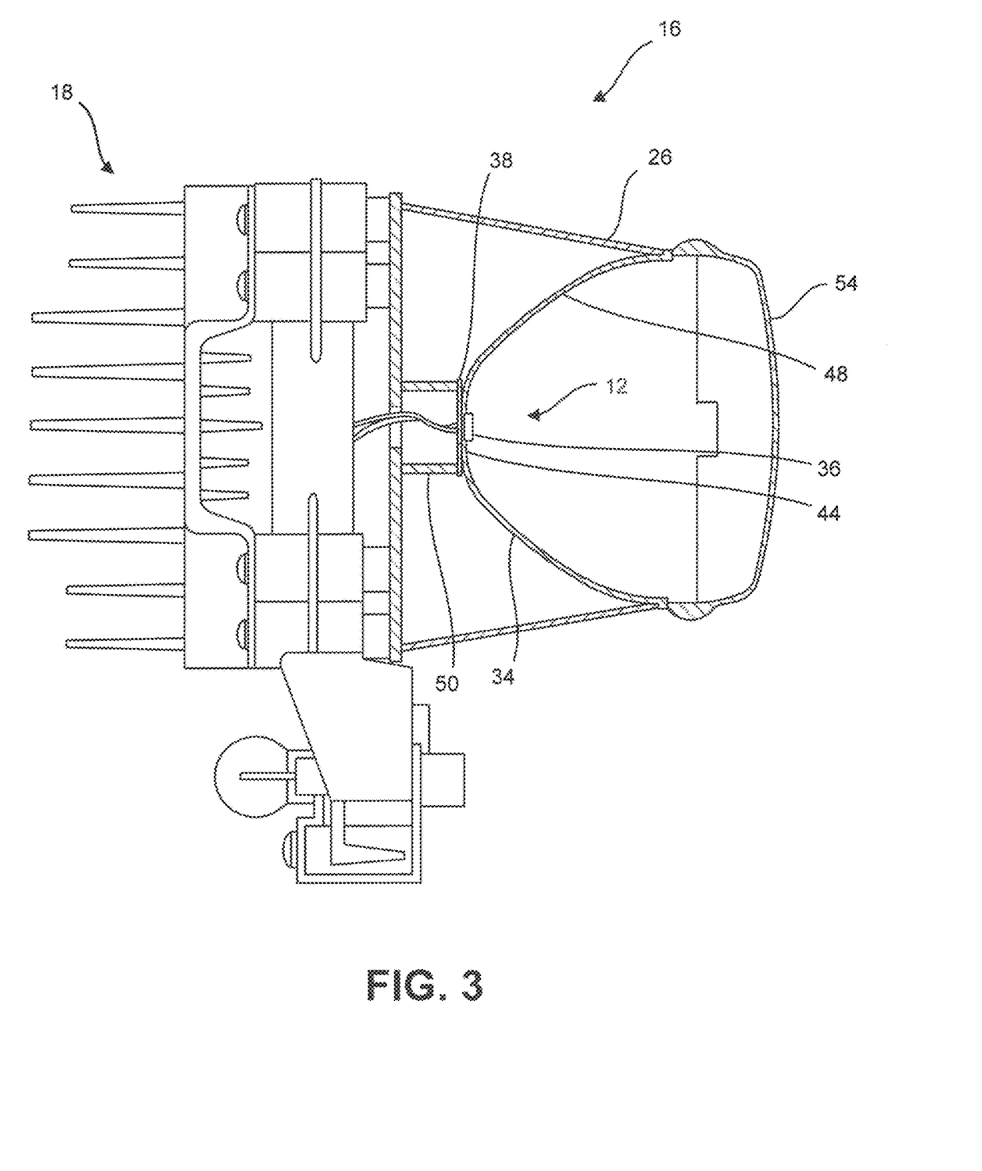
FIG. 3 is a perspective view of one embodiment of a light assembly that may be formed in accordance with the present disclosure.

Referring to FIG. 3, for instance, a light assembly 16 is illustrated that can optionally include a heat sink 18 for dissipating heat from a light source, such as an LED module 12.

As shown, the heat sink 18 may be located external to an outer housing 26 of the light assembly 16. The heat sink 18 is attached directly to the housing 26 or LED module 12 for conducting away heat.

The LED module 12 may contain one or more light-emitting diodes 36 (e.g., two), which can be located on a substrate 38. A LED circuit 44 is also positioned on the substrate 38. A reflector 48 assists in directing light from the LED module in the desired direction. The reflector 48 may include a shell 34 with a reflective coating on an inner surface thereof, such as a metallic coating. Current can be supplied to the LED module 12 from the battery of the vehicle to cause the diodes 36 to emit light, which then passes through a lens 54 and projected outwardly from the light assembly 16 by the reflector 48. As the LED emits light, it also creates heat, which can be removed by the heat sink 18.

As shown in FIG. 3, the housing 26 can include one or more frame members 50 that are enclosed within the housing 26 for supporting the LED module 12. In accordance with the present disclosure, the frame members 50 and/or the housing 26 can be made from the conductive polymer composition of the present disclosure. By making the housing 26 and/or the frame members 50 from the conductive polymer composition, heat is conducted away from the LED module 12 which prolongs the life of the headlamp.

In addition to the housing 26 and the frame members 50, the heat sink 18 and the reflector or shell 34 can also be made from a polymer composition in accordance with the present disclosure.

When used to produce the housing 26, the frame members 50, and/or the reflector 48 as shown in FIG. 3, the polymer composition may contain a thermally conductive particulate material. The thermally conductive particulate material may be used to allow heat to dissipate and spread uniformly over the molded part. The thermally conductive particulate material, for instance, can prevent one area of the molded part from becoming overheated. Thus, inclusion of a thermally conductive particulate material into the polymer composition can be utilized above and beyond heat sink applications.

The present invention may be better understood with reference to the following examples.

Test Methods

Deflection Temperature Under Load ("DTUL"):

The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation:

Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Strain:

Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength:

Notched Charpy properties may be tested according to ISO Test No. ISO 179-1:2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Thermal Conductivity:

In-plane and through-plane thermal conductivity values are determined in accordance with ASTM E1461-13.

The present disclosure may be better understood with reference to the following examples.

EXAMPLES

A polymer composition was formulated in accordance with the present disclosure and tested for various properties.

More particularly, the following formulation was tested:

| Component | Wt. % |
|---|---|
| Polyethylene terephthalate (0.64 dL/g) polymer | 14.3 |
| Polybutylene terephthalate polymer | 43 |
| Graphite particles | 7.5 |
| Fiberglass (400 micron length) | 35 |
| Bis(2,4-dicumylphenyl) pentaerythritol diphosphite | 0.2 |

The above formulation was molded into test plaques and the following results were obtained.

| | Method | Units | TKX1008D |
|---|---|---|---|
| Density | ISO 1183 | kg/m$^3$ | 1661 |
| Tensile Modulus | ISO 527-2/1A | GPa | 14 |
| Tensile Strength | ISO 527-2/1A | MPa | 130 |
| Elongation | ISO 527-2/1A | % | 1.54 |
| Charpy Notched impact strength (+23° C.) | ISO 179/1U | kJ/m2 | 8.1 |
| DTUL at 1.8 MPa | ISO 75-1/-2 | ° C. | 210 |
| Though Plane Conductivity | ASTM E1461 | W/m * K | 1.1 |
| In Plane Conductivity | ASTM E1461 | W/m * K | 2.2 |

The above composition was also tested for glossiness and compared to a similar polymer composition only containing a polyethylene terephthalate polymer. The following results were obtained.

| | Glossiness (%) | | |
|---|---|---|---|
| | 20° incident angle | 60° incident angle | 85° incident angle |
| PET/PBT composition | 20 | 65 | 77 |
| PET composition | 1 | 8 | 22 |

As shown above, the composition made in accordance with the present disclosure had dramatic and unexpectedly better surface characteristics than the composition only containing the polyethylene terephthalate polymer.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer product comprising:
a molded article having an exterior surface, the molded article being made from a polymer composition comprising a mixture of a first polyester polymer and a second polyester polymer, the first polyester polymer having a different crystallization rate than the second polyester polymer, the exterior surface having a gloss greater than an identical article made from only the first polyester polymer or only from the second polyester polymer.

2. A polymer product as defined in claim 1, wherein the exterior surface of the molded article has a glossiness of at least 50% when measured at an angle of incidence of 60°.

3. A polymer product as defined in claim 1, wherein the polymer composition further contains reinforcing fibers.

4. A polymer product as defined in claim 3, wherein the reinforcing fibers comprise glass fibers, the glass fibers being present in the composition in an amount from about 10% to about 60% by weight.

5. A polymer product as defined in claim 1, wherein the polymer composition further contains a compatibilizing agent for the first polyester polymer and the second polyester polymer, the compatibilizing agent being configured to inhibit reactions between the first polyester polymer and the second polyester polymer.

6. A polymer product as defined in claim 5, wherein the compatibilizing agent comprises a diphosphite.

7. A polymer product as defined in claim 1, wherein the polymer composition contains a thermally conductive particulate material comprising graphite or boron nitride and being present in an amount sufficient for the polymer composition to have an in-plane thermal conductivity of about 2 W/m-K or more.

8. A polymer product as defined in claim 1, wherein the polymer composition exhibits a tensile strength of greater than about 110 MPa and a tensile modulus of about 10,000 MPa or more as determined in accordance with ISO Test No. 527-2012 at a temperature of 23° C.

9. A polymer product as defined in claim 1, wherein one of the polyester polymers comprises a polyethylene terephthalate.

10. A polymer product as defined in claim 1, wherein the first polyester polymer and the second polyester polymer comprise a polyethylene terephthalate polymer, a polybutylene terephthalate polymer, a liquid crystal polymer, a polycyclohexylenedimethylene terephthalate polymer, or a copolyester polymer.

11. A polymer product as defined in claim 1, wherein the first polyester polymer comprises a polyethylene terephthalate and the second polyester polymer comprises a polybutylene terephthalate.

12. A polymer product as defined in claim 1, wherein the polymer product comprises a light assembly containing an LED module that contains one or more light-emitting diodes, the light assembly including a housing made from the polymer composition.

13. A polymer product as defined in claim 1, wherein the polymer product comprises a camera module.

14. A polymer composition comprising:
a first polyester polymer;
a second polyester polymer; and
a compatibilizing agent for the first polyester polymer and the second polyester polymer, the compatibilizing agent being configured to inhibit reactions between the first polyester polymer and the second polyester polymer, the compatibilizing agent comprising a phosphorus compound.

15. A polymer composition as defined in claim 14, wherein the compatibilizing agent comprises a diphosphite.

16. A polymer composition as defined in claim 15, wherein the compatibilizing agent comprises a pentaerythritol diphosphite, the compatibilizing agent being present in the polymer composition in an amount from about 0.05% to about 2% by weight.

17. A polymer composition as defined in claim 14, wherein the first polyester polymer comprises a polyethylene terephthalate and the second polyester polymer comprises a polybutylene terephthalate.

18. A polymer composition as defined in claim 14, wherein the first polyester polymer comprises a polyethylene terephthalate or a polybutylene terephthalate and the second polyester polymer comprises a polycyclohexylenedimethylene terephthalate, a thermotropic liquid crystalline polymer, or a copolyester polymer.

19. A polymer composition as defined in claim 14, wherein the polymer composition further contains reinforcing fibers.

20. A polymer composition as defined in claim 14, wherein the polymer composition further contains a thermally conductive particulate material having an intrinsic thermal conductivity of about 50 W/m-K or more.

21. A polymer composition as defined in claim 17, wherein the composition further contains glass fibers in an amount from about 20% to about 60% by weight, the composition further comprising a thermally conductive particulate matter comprising graphite, the thermally conductive particulate matter being present in the composition in an amount from about 1% to about 15% by weight.

* * * * *